June 12, 1956 R. K. ORTHUBER ET AL 2,749,598
METHOD OF PREPARING ELECTROSTATIC SHUTTER MOSAICS
Filed Feb. 1, 1952 2 Sheets-Sheet 1

INVENTORS.
RICHARD K. ORTHUBER
JOHN E. CLEMENS
BY BEN B. JOHNSTONE
James L. Shannon
AGENT
Wade Kranitz
ATTORNEY

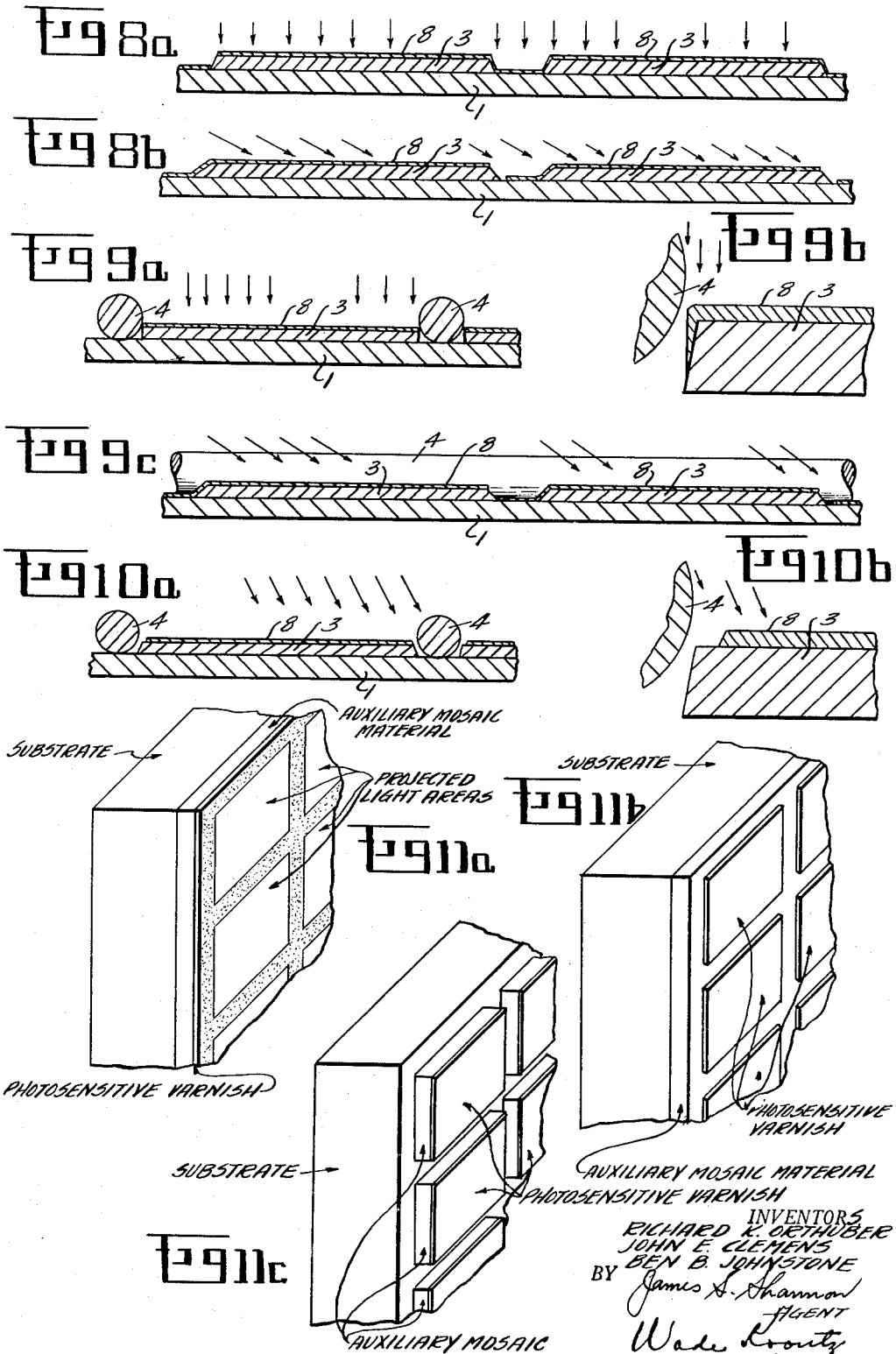

United States Patent Office 2,749,598
Patented June 12, 1956

2,749,598
METHOD OF PREPARING ELECTROSTATIC SHUTTER MOSAICS

Richard K. Orthuber, Fort Wayne, Ind., and John E. Clemens, Xenia, and Ben B. Johnstone, Dayton, Ohio, assignors to the United States of America as represented by the United States Air Force Application February 1, 1952, Serial No. 269,569

6 Claims. (Cl. 29—25.17)

(Granted under Title 35, U. S. Code (1952), sec. 266)

The invention described herein may be manufactured and used by or for the Government for governmental purposes, without the payment to us of any royalty thereon.

This invention relates to cathode-ray tube mosaics and particularly to a method of preparing mosaics of the electrostatic shutter type for use in cathode-ray tube projection systems.

Such mosaics consist of a multitude of metallic flaps of elemental size attached to a flat substrate which may be either transparent or opaque depending upon the type projection system in which the mosaic is to be used. The electron beam of the cathode-ray tube is caused to scan over the mosaic, or else over a transparent dielectric element placed opposite and close to the mosaic, so as to control the charge on or in the vicinity of the flaps. The resulting electrostatic force acting on each flap causes a bending thereof in proportion to the strength of the force. A projection lens system is used to form an image of the mosaic on a projection screen. Two methods of illuminating the mosaic from the projection light source are possible. In one method, in which the substrate must be transparent, light is passed through the mosaic, with each flap controlling the amount of light passing through the corresponding part of the mosaic to the projection screen as a function of the amount of bending of the flap. In the other method, each elemental flap acts as a small mirror reflecting light from the projection light source into the projection lens in an amount determined by the degree of bending of the particular flap. The mosaic and projection systems of the above type are described and claimed in the applications of Richard K. Orthuber, Serial Numbers 240,722 and 248,439, filed August 7, 1951, and September 26, 1951, respectively. Application Serial No. 248,439, filed September 26, 1951, is now Patent No. 2,681,380, granted June 15, 1954.

In a mosaic of the above described type it is desirable that the flap size be as small as possible, that the ratio of total flap area to total mosaic area be as high as possible, and in cases where the flaps act as reflectors, that the flap surfaces be as flat as possible. In the latter case it is also desirable that the reflecting portion of the flap be more rigid than the portion attaching the flap to the substrate so that substantially all bending will take place in this portion. It is the object of the invention to provide a method of preparing a mosaic which meets as nearly as possible the above requirements.

The details of the method along with preferred procedures for carrying it out will be described in connection with the accompanying drawings, in which:

Figs. 8a, 8b, 9a, 9b, 9c, 10a and 10b show methods of depositing the permanent mosaic; and Figs. 11a, 11b and 11c illustrate the photoengraving method of producing the auxiliary mosaic.

Figure 1:
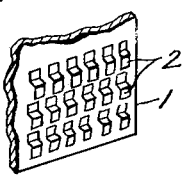
Fig. 1 shows a portion of a photosensitive shutter mosaic.

A small portion of an electrostatic shutter mosaic, drawn to a large scale, is shown in Fig. 1. The mosaic comprises a substrate 1 on which are mounted a multitude of minute flaps 2 uniformly distributed over the surface of the substrate, preferably in straight horizontal rows. In general, the number of such rows should be at least equal to and preferably higher than the number of horizontal scanning lines contained in one complete frame in the television system, and the dimensions of the flaps should be not greater than the height of the mosaic divided by the number of scanning lines. The substrate 1 may be transparent or opaque as already explained. Mica or glass are suitable materials for a nonconductive transparent substrate. For a conductive transparent substrate the mica or glass may be covered with a thin transparent metallic film. A suitable metal such as aluminum may be used for an opaque mosaic. The flaps 2 are made of metal such as aluminum or other opaque or reflective material, are preferably of rectangular shape and are connected to the substrate at one edge only. The flexibility of the attaching portions of the flaps must be such that the electrostatic forces acting upon them, as a result of electric charges applied to or near them by the electron beam, can bend the flaps to a degree detectable with the optical system used.

Figure 2:
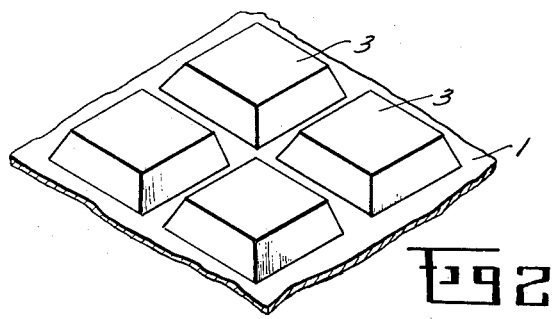
Fig. 2 shows the auxiliary mosaic.
Figure 3:
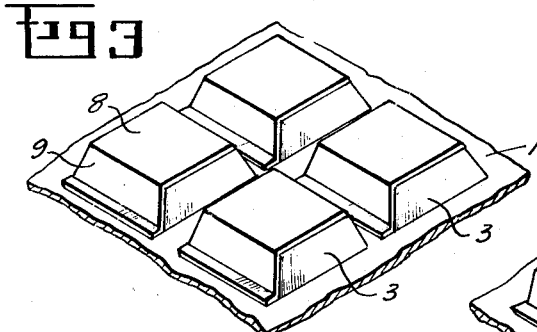
Fig. 3 shows the auxiliary mosaic covered with permanent mosaic material.
Figure 4:
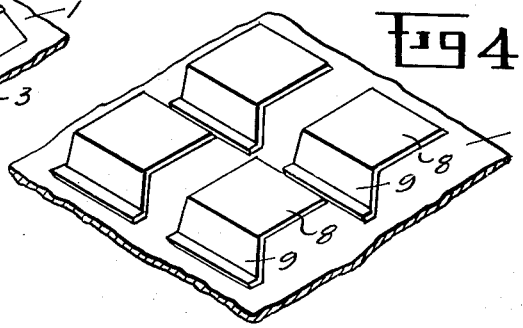
Fig. 4 shows the permanent mosaic after removal of the auxiliary mosaic.

The process of preparing a mosaic of the above type consists of three general steps: (1) There is applied to the substrate a layer of easily removable material which is divided into a multitude of elements with optically flat surfaces and separated from each other by lines where the substrate remains uncoated or only slightly coated. This layer is called the auxiliary mosaic and may consist of elements such as shown in Fig. 2 in which 1 represents the substrate and 3 represents the elements. (2) The auxiliary mosaic is coated with a thin layer of the material which is to constitute the flaps of the finished mosaic by condensation of a vapor beam impinging in an inclined direction so that at least three side slopes of the elements are not or only to a negligible degree reached by the vapor molecules. Material is deposited on the top and one side slope of the elements and on parts of the substrate as shown in Fig. 3. (3) The auxiliary mosaic is removed so that only the permanent mosaic is left as shown in Fig. 4.

Figure 5:
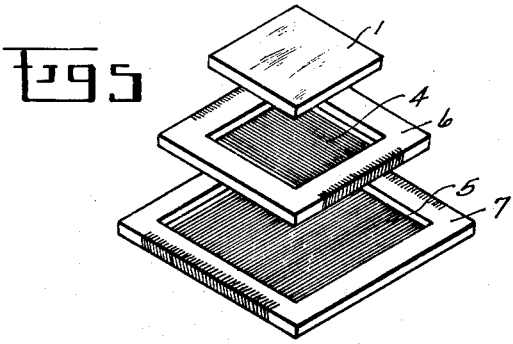
Figs. 5, 6a and 6b show a wire mask used in one process of forming the auxiliary mosaic.
Figure 6A:
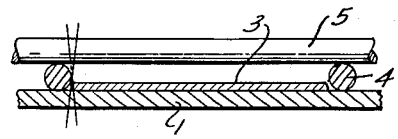
Figure 6B:
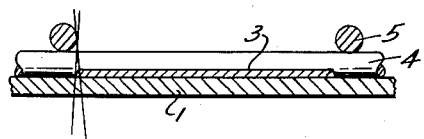

The above steps may be carried out in different ways. Regarding step (1) the auxiliary mosaic can be built up by evaporation through crossed wire masks as shown in Fig. 5. Two systems 4 and 5 of parallel equidistant wires are attached to two frames 6 and 7. Frame 6 is designed to fit inside frame 7 with the wires running crosswise and substrate 1 fits inside frame 6 against the wires. The assembly is exposed to a vapor beam of the material chosen for the auxiliary mosaic in a high vacuum of $10^{-5}$ mm. Hg or better, the cross wires allowing the vapor to condense on the substrate only where it is not covered thereby. In this way rectangular elements 3 are built up on substrate 1 as illustrated in Figs. 6a and 6b. Since the vapor source has finite dimensions the shadow cast by the wires will be surrounded by a penumbra where the vapor density decreases linearly toward the edge of the elements. Consequently the thickness of the elements decreases linearly at their edges and the elements assume the form of truncated pyramids. Suitable materials for the auxiliary mosaic are selenium, cadmium, antimony, metallic arsenic, iron and nickel.

Another method of forming the auxiliary mosaic utilizes photoengraving techniques. In this case an uninterrupted layer of the auxiliary material is applied to the substrate. This layer is coated with photosensitive varnish and the desired rectangular areas optically projected thereon. The unexposed areas of the varnish are dissolved and the auxiliary coating beneath etched out so that only those parts of the auxiliary coating are left which are protected by the exposed and therefore not dissolved parts of the photosensitive varnish.

This process is illustrated in Figs. 11a, 11b and 11c. Fig. 11a shows the projection of the desired rectangular areas upon the surface of the photosensitive varnish. Fig. 11b shows the mosaic after removal of the unexposed varnish. Fig. 11c shows the mosaic after removal of the auxiliary mosaic material that was located beneath the unexposed varnish. The final result is again similar to that shown in Fig. 2. Suitable photosensitive varnishes and solvents therefor are available commercially.

Figure 7:
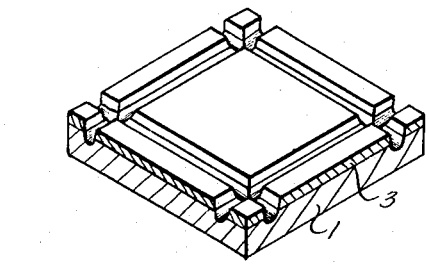
Fig. 7 shows an engraving method of producing the auxiliary mosaic.

The auxiliary mosaic may also be prepared by a machining process as shown in Fig. 7. Here again the substrate 1 is coated with a layer 3 of the material for the auxiliary mosaic. By ruling out parallel and equidistant grooves reaching the substrate or cutting slightly into it the auxiliary layer is subdivided into separate elements.

Step (2), the coating of the auxiliary mosaic with a thin layer of the flap material, is illustrated in Figs. 8a–8b, 9a–9b 9c and 10a–10b. Fig. 8a shows a cross section through an auxiliary mosaic along a vertical plane parallel to the wires 5 (Fig. 6a). As seen in this direction the paths of the vapor molecules impinging on the mosaic should be perpendicular to the substrate. Fig. 8b shows a cross section perpendicular to Fig. 8a, or parallel to wires 4 (Fig. 6b). In this view the path of the vapor molecules forms an acute angle with the substrate, so that no vapor impinges on the right side of the elements 3 shown in Fig. 8b. The side slopes of elements 3 visible in Fig. 8a, because of their steepness, are only slightly coated during the condensation of the permanent material and the deposited layer 8 is kept thin. This slight coating forms only a weak connection to the substrate which may be broken by electrostatic forces to free the flaps.

The above mentioned undesired connections can be avoided by having the wires 4 in contact with the substrate after the auxiliary mosaic has been deposited by vapor condensation as shown in Figs. 9a and 9c. The directions of the impinging vapor beam are the same as in Figs. 8a and 8b. If the source for the permanent flap material has smaller dimensions than the source previously used for the evaporation of the auxiliary material and both sources have the same position relative to the substrate the penumbra of the permanent material will not reach down to the substrate and the undesirable connections of the flap with the substrate are reduced to extremely thin brims at the edges of the flaps, as shown in Fig. 9b. These brims too may be avoided if the vapor for the permanent mosaic is caused to impinge in an inclined direction also in the plane shown in Fig. 9a. In this way the shadow cast by the wire prevents vapor condensing on the left slope of element 3 and the shadow of the right edge of element 3 prevents vapor from reaching the right slope. This process is illustrated in Figs. 10a and 10b.

With auxiliary mosaics produced by photo-etching or machining undesired connections of the flaps with the substrate are much easier avoided, since with those processes it is possible to achieve slopes which are practically perpendicular to the substrate or even undercut. In such cases evaporation as in Figs. 8a and 8b can produce permanent elements with only one connection to the substrate.

Step (3) of the method accomplishes the removal of the auxiliary mosaic. After application of the permanent mosaic the auxiliary mosaic is removed by evaporation or sublimation, or by dissolution in a liquid or gaseous solvent. Cadmium, antimony, arsenic, or other materials which evaporate at relatively low temperatures and before melting are suitable auxiliary mosaic material which may be removed by sublimation. If this process is to be used the permanent mosaic must be able to stand the treatment. Permanent mosaic materials well suited for this purpose are aluminum, silicon oxide and silicon dioxide. The last two must be aluminized later on to assure the necessary opacity and reflectivity.

Suitable auxiliary mosaic materials for removal by dissolution are selenium, iron and nickel. Carbon disulphide may be used as a solvent for selenium and gaseous carbon dioxide for iron and nickel.

With liquid solvents it is difficult to prevent adhesion of the flaps to the substrate after the auxiliary mosaic is removed. This adhesion may be prevented by application of a technique used in the processing of replicas in electron-microscopy. The auxiliary mosaic may consist of aluminum. The permanent flaps on top of the aluminum elements may be of silicon oxide or silicon dioxide. If a mercuric chloride solution is used as solvent for the aluminum elements, mercury is set free during the dissolving process underneath the flaps and, because the mercury forms a non-wetting interlayer; the flaps are prevented from being glued to the substrate.

As already stated, in projection systems in which the flaps act as small reflectors, the faces 8, as shown for example in Figs. 4 and 8b, should be optically flat and should remain so for all degrees of deflection of the flap. This result may be achieved by making the face portion 8 of the flap relatively thicker and therefore relatively stiffer than the connecting or hinge part 9. Where this type flap is required a fourth step may be added to the general method in which, before or after the auxiliary mosaic has been removed, there is a further evaporation of permanent mosaic material onto the permanent mosaic with a vapor beam direction perpendicular to the substrate. This results in a greater build-up of material on the surfaces 8 (Fig. 4), with respect to which the beam direction is normal, than on surfaces 9, with respect to which the beam direction makes an acute angle.

We claim:

1. The method of making an electrostatic shutter mosaic consisting of a multitude of flaps of elemental area each attached to a substrate along one edge, said method comprising the steps of covering said substrate with a uniform layer of a removable auxiliary mosaic material, covering said layer of auxiliary mosaic material with a layer of photosensitive varnish, optically projecting onto said varnish layer a multitude of elemental substantially rectangular areas of light arranged in orthogonal rows, dissolving the unexposed varnish with a selective solvent, removing the auxiliary mosaic material exposed by the dissolved varnish to form an auxiliary mosaic of minute rectangular mounds of auxiliary mosaic material, directing a vapor beam of permanent mosaic material toward said substrate and auxiliary mosaic in a direction parallel to one set of said orthogonal rows and inclined relative to said substrate in order to deposit permanent mosaic material on the top and one side of each of said mounds, and completely removing said auxiliary mosaic material.

2. The method of claim 1 including the additional step of increasing the thickness of the permanent mosaic material on the mound tops in relation to that on the mound sides by further depositing permanent mosaic material by a vapor beam of said material directed normally to said substrate.

3. The method of claim 1 in which said auxiliary mosaic material is selenium and the auxiliary mosaic is removed by dissolving in carbon disulphide.

4. The method of claim 1 in which said auxiliary mosaid material is selected from the group consisting of iron and nickel and the auxiliary mosaic is removed by dissolving in gaseous carbon dioxide.

5. The method of claim 1 in which said auxiliary mosaic material is a sublimatable substance selected from the group consisting of cadmium, antimony and arsenic and the auxiliary mosaic is removed by sublimation.

6. The method of claim 1 in which said permanent mosaic material is silicon oxide, said auxiliary mosaic material is aluminum, and the auxiliary mosaic is removed by dissolving in mercuric chloride.

References Cited in the file of this patent

UNITED STATES PATENTS 2,644,208    Auphan _____ July 7, 1953